United States Patent [19]

Haberl

[11] Patent Number: 4,710,619
[45] Date of Patent: Dec. 1, 1987

[54] APPARATUS FOR GENERATING A SIGNAL PROVIDING INFORMATION REGARDING A RADIATING SOURCE, ESPECIALLY AN INFRARED SOURCE

[75] Inventor: Fritz Haberl, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 811,667

[22] Filed: Dec. 20, 1985

[30] Foreign Application Priority Data

Dec. 21, 1984 [DE] Fed. Rep. of Germany ....... 3447721

[51] Int. Cl.⁴ .............................................. G05D 1/08
[52] U.S. Cl. ................................ 250/203 R; 250/351; 250/353; 250/232; 356/141
[58] Field of Search ................... 250/203 R, 202, 209, 250/578, 351, 353, 338, 232; 356/141; 244/3.16–3.18

[56] References Cited

U.S. PATENT DOCUMENTS

| 3,162,764 | 12/1964 | Haviland | 244/3.18 |
| 3,610,761 | 10/1971 | Cudmore et al. | 356/141 |
| 3,936,629 | 2/1976 | Desvignes | 250/203 R |
| 3,952,208 | 4/1976 | Desvignes et al. | 250/209 |
| 3,981,588 | 9/1976 | Wirtanen | 250/203 R |

Primary Examiner—Edward P. Westin
Assistant Examiner—Charles Wieland
Attorney, Agent, or Firm—W. G. Fasse; D. H. Kane, Jr.

[57] ABSTRACT

Information regarding an object, especially brightness information, is obtained by scanning the object with an optical scanner, especially an infrared scanner to provide a respective analog signal. The analog signal is produced by passing the received radiation past a chopper disk onto a detector through a secondary optical assembly. The output signal of the detector is digitized and supplied to a fast Fourier transformation processor which also receives a counting signal derived from the oscillation of the chopper disk. The system may be used, for example, for obtaining deviation and/or presence signals regarding the orientation of an earth satellite relative to the center of the earth.

9 Claims, 3 Drawing Figures

APPARATUS FOR GENERATING A SIGNAL PROVIDING INFORMATION REGARDING A RADIATING SOURCE, ESPECIALLY AN INFRARED SOURCE

FIELD OF THE INVENTION

The invention relates to an apparatus for generating a signal based on radiation received from a radiating source, especially an infrared radiating source, such as a star, or the earth, or an object on earth. The generated signal is used for producing information, for example, regarding an earth satellite. More specifically, the generated signal may provide information regarding the deviation of the satellite attitude from a desired attitude relative to the earth, especially to earth center, and/or regarding the presence of the earth within the field of view of that apparatus.

DESCRIPTION OF THE PRIOR ART

It is known to generate signals providing information regarding a satellite in a predetermined position above the earth, regarding especially a deviation of the satellite altitude from a desired altitude. An earth horizon sensor is installed for this purpose in the satellite. The earth horizon sensor comprises optical input means for imaging the earth onto a chopper disk. The chopper disk has a diameter corresponding approximately to the diameter of the earth's image. A chopper drive moves the chopper disk periodically back and forth for passing radiation past the moving chopper disk onto a detector for providing a sensor signal for registering the radiation. A vibration sensor is arranged to sense the oscillating movement of the chopper disk for providing a periodic chopper signal having an amplitude and frequency representing the oscillating movement of the chopper disk.

In connection with earth satellits orbiting the earth, especially on a geostationary orbit, it is frequently necessary to assure a precise orientation of the satellite toward the earth, or rather of the satellite antennas toward the earth. For example, antennas of geostationary communication satellites must be directed the more precisely onto the respective target area on the earth's surface, the narrower their directional characteristic is. The precision requirements relevant in this context are in the order of several hundredths of an arc degree. The sensors used for this purpose are optical sensors, especially infrared sensors, comprising input optical means having an axis which should be oriented or trained as precisely as possible onto the center of the earth. In order to ascertain deviations from such ideal orientation toward the earth's center an image of the earth is projected by the input optical means onto a chopper disk which, in its image plane, has a diameter corresponding to the diameter of the earth's image. The chopper disk is vibrated with a frequency corresponding to the eigenfrequency of the chopper disk and with a stabilized amplitude of its oscillating movement. Thus, as long as the sensor is precisely oriented, or rather aligned, with the earth's center, the opposite edges of the earth's image are periodically revealed and covered again. These "opposite" edges of the earth's image are located opposite each other in the direction of the oscillating movement of the chopper disk. Due to this repeated revealing and covering the infrared radiation emanating from the earth and thus also from the earth's edges passes periodically past the upper and lower edge of the oscillating chopper disk. These radiation components are then directed onto a detector usually with the aid of secondary optical means. The detector provides a periodic sensor signal which does not contain the fundamental wave of the chopper disk oscillation as long as the optical input sensor is precisely directed onto the earth's center. The oscillation of the chopper disk is picked up or registered by a vibration sensor which generally operates as an inductive sensor to provide a periodic chopper signal. The sensor signal representing the infrared radiation, for example, and the chopper signal are then evaluated. The sensor signal contains the fundamental wave of the chopper oscillation if a deviation is present. A deviation in this context means an aberration of the optical axis of the optical input means from the line connecting the satellite with the earth's center. Thus, a deviation signal as well as a presence signal can be derived from the sensor signal and the chopper signal. The so-called presence signal provides information whether the earth is located at all within the range of vision of the optical input means of the earth's horizon sensor in the satellite. The calculation of the deviation signal is accomplished substantially by a mathematical convolution or folding operation of the sensor signal with the chopper signal which has first been transformed into a square wave voltage. The calculation of the presence signal is accomplished also by a convolution of the sensor signal with a square wave signal having twice the frequency of the chopper signal while simultaneously taking into account the deviation signal.

Heretofore, it was customary to process the analog signals in an analog manner, whereby the used electronic circuit components had to meet high requirements regarding their stability, for example, with regard to aging and drift, in order to satisfy the high precision requirement of the alignment of the satellite antenna toward the earth's center. As a result, it was necessary to carefully select the electronic circuit components, to measure them, and to adjust them. All these requirements contributed substantially to the high cost of prior art structures used for the purposes outlined above.

OBJECTS OF THE INVENTION

In view of the above it is the aim of the invention to achieve the following objects singly or in combination:

to provide an apparatus which is technically as simple as possible, while using inexpensive electronic circuit components for processing the above mentioned signals in a digital manner rather than in an analog manner;

to use electronic circuit components which are relatively inexpensive, yet have a high stability over long periods of time;

to provide the required deviation and/or presence signals with a high precision having regard to the above mentioned alignment or directional requirement within a fraction of an arc degree; and to filter the periodic sensor signal in such a manner that the amplitude of the fundamental wave, or rather, of the first harmonic wave of the sensor signal may be used for calculating the deviation signal and so that the amplitude of the second harmonic wave of the periodic sensor signal may be used for calculating the presence signal.

SUMMARY OF THE INVENTION

According to the invention there is provided a circuit arrangement in which an analog-to-digital converter having an input connected to the detector or sensor, for converting the analog sensor signal into respective digital or digitized signals. A phase-locked loop circuit including a phase detector is connected with one of the two phase detector inputs to the vibration pick-up for receiving the periodic chopper signal. The other phase detector input is connected to receive a carry pulse as a impulse train from a counter. A PI-control amplifier of the phase-locked loop circuit is connected with its input to the output of the phase detector for integrating the output signals of the phase detector. A voltage controlled oscillator of the phase-locked loop is connected with its input to the output of the control amplifier. The output of the voltage controlled oscillator provides a sequence of start impulses to the analog-to-digital converter and to the above mentioned counter for generating the carry pulse supplied to the other input of the phase detector. The counter is a mode-M-counter and counts the sequence of start impulses up to a preadjusted value. When that value is reached, it provides a carry signal and starts the counting from zero again. In other words, the mode-M counter divides the start impulses by a preadjustable number. A fast Fourier transformation processor is connected with one of its two inputs to the output of the analog-to-digital converter for receiving the digitized sensor signals. The other input of the fast Fourier transformation processor is connected to the mode-M counter for receiving continuously counter values representing discrete phase increments of the chopper frequency. The fast Fourier transformation processor calculates the deviation signal and-/or the presence signal and provides these signals at its respective outputs. These signals may be used to correct the satellite altitude Thus, according to the invention the conventional analog signal evaluation has been replaced by a digital signal evaluation, whereby the advantages of digital signal processing are fully utilized. Especially, digital signal processing provides a practically unlimited resolution, a high circuit stability over long periods of time, as well as a high reproduceability in the manufacturing of the digital circuits. In other words, the quality of the digital circuits is very uniform. A special advantage is seen in the fact that a drift in the chopper frequency, which cannot always be avoided, is practially compensated automatically and in that an expensive tuning for avoiding a phase difference between the sensor signal and the chopper signal has been avoided.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
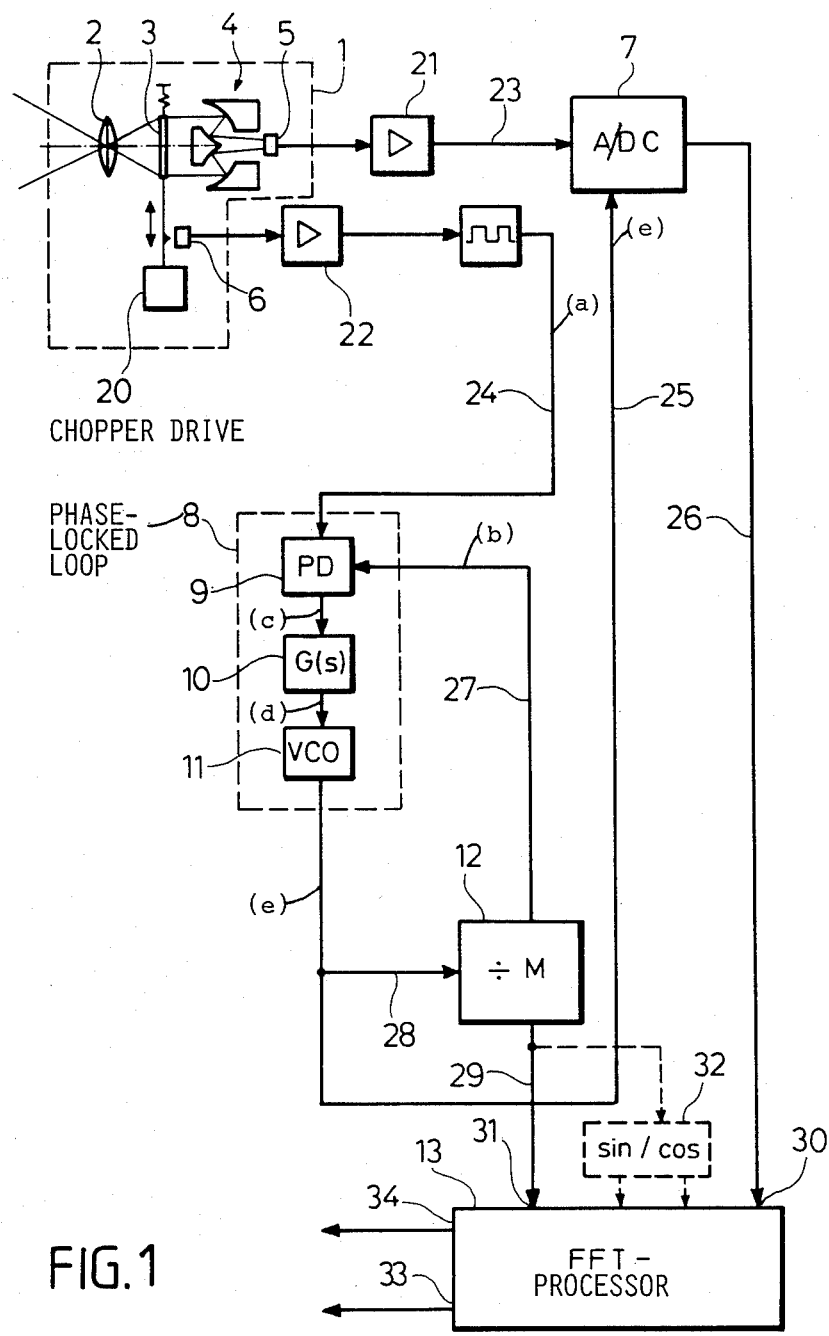
FIG. 1 shows a block circuit diagram of an apparatus according to the invention.

FIG. 1 shows an earth's horizon sensor 1 comprising an input optical member such as an infrared lens 2 for imaging the earth on a chopper disk 3 which is substantially circular. When the optical axis of the optical member 2 is precisely oriented toward the center of the earth and when the chopper disk 3 is stationary, the earth's image is precisely covered by the disk 3 so that radiation received through the optical member 2 cannot pass past the edges of the chopper disk 3. However, if the chopper disk 3 is caused to periodically oscillate in the image plane of the input optical member 2, by a chopper disk drive 20, radiation energy can pass periodically the upper and lower edge of the chopper disk 3. These radiation energy components, which are preferably in the infrared range, as mentioned above, are directed onto a detector or sensor 5 by a secondary optical system 4 located downstream of the chopper disk 3 as viewed in the travel direction of the radiation. The output of the sensor 5 provides a sensor signal $U_s$ which varies periodically with the period $T_c$ of the chopper oscillation. The sensor signal $U_s$ is an analog signal which, if desired, may be amplified in an amplifier 21 before supplying the sensor signal $U_s$ to one input 23 of an analog-to-digital convertor 7.

The analog sensor signal $U_s$ at the output of the sensor or detector 5 comprises a sequence of approximately sinusoidal half waves which ideally always have the same amplitude as long as the satellite, is properly directed toward the center of the earth. However, when a deviation exists, the amplitude of these sinusoidal half waves will be alternately larger and smaller. The amplifier 21 amplifies the sensor signal $U_s$ and feeds it to the input 23 of the analog-to-digital convertor 7.

The chopper disk 3 is driven by chopper drive 20, such as a vibrator, to perform a periodic oscillation which is picked up by a vibration pick-up 6 for recording the chopper signal $C_s$. The pick-up 6 is preferably an inductive type pick-up for sensing the time characteristic of the chopper signal. The chopper signal is also an analog signal which is supplied to an amplifier 22, the output of which is connected to a square wave generator 22' providing an output square wave shown at (a) in FIG. 2. The square wave (a) of the chopper signal $C_s$ has the frequency $f_c$ of the chopper disk oscillation.

By applying the Fourier transformation to the digitized sensor signal that appears at the output of the analog-to-digital convertor 7, it is possible to determine in principle the amplitudes of the spectral lines of the periodic sensor signal. The amplitudes are obtained as the Fourier coefficients of the individual spectral lines. According to the invention the signal processing shall take place digitally, whereby the so-called fast Fourier transformation (FFT) is employed. Reference is made in this connection to "The Fast Fourier Transform", by E. 0. Brigham, Prentice-Hall, 1974. Regardless whether normal Fourier transformation or fast Fourier transformation is employed, it is necessary in both instances, to filter out the fundamental or first harmonic wave of the sensor signal $U_s$ for calculating the deviating signal and to filter out the amplitude of the second harmonic wave of the periodic sensor signal $U_s$ for calculating the presence signal.

Figure 2:
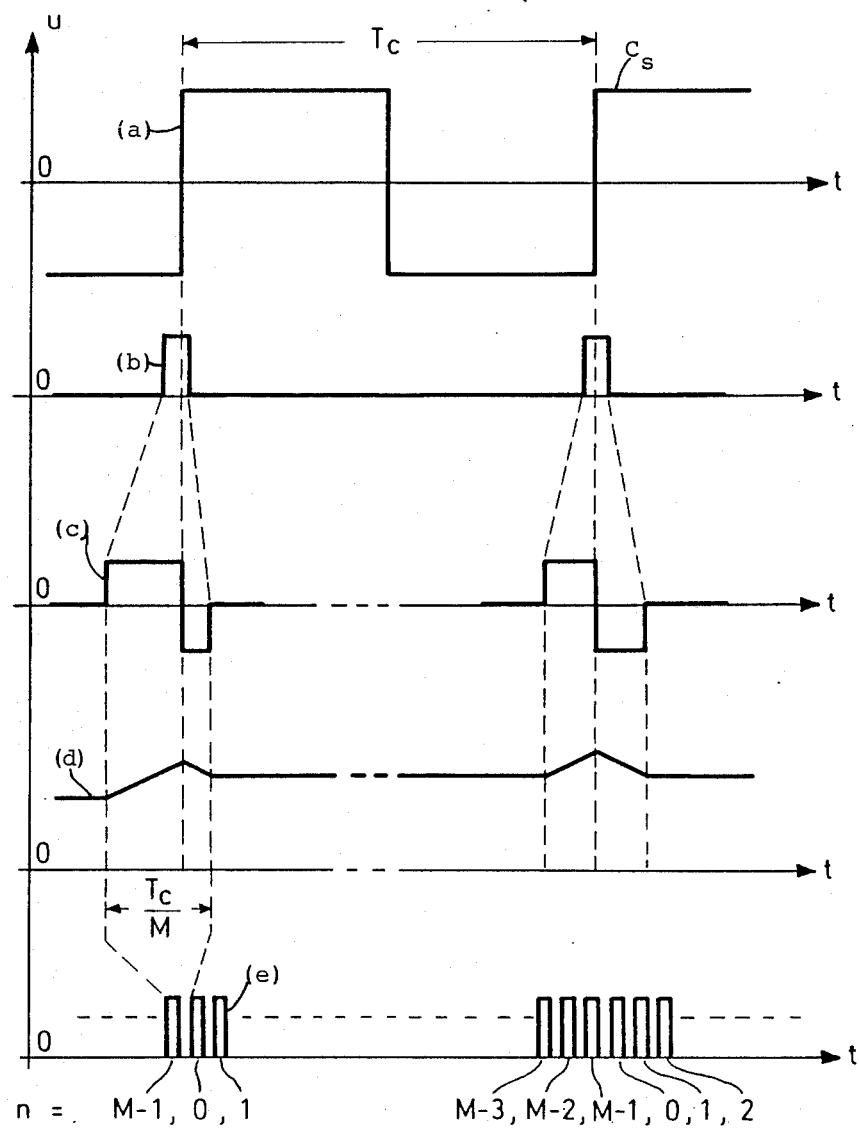
FIG. 2 shows a diagram of several wave forms appearing at the designated points in the circuit diagram of FIG. 1.

The analog-to-digital converter 7, which receives at its input 23 the sensor signal $U_s$, receives at its further input 25 a sequence of start impulses shown at (e) in FIG. 2 and derived from a phase locked loop circuit 8 to be described in more detail below. A larger number of such starting pulses (e) are applied to the input 25 of the converter 7 during a period $T_s$ or $T_c$. During the relatively short duration of each of these starting pulses (e), the converter 7 is triggered to digitize the amplitude of the analog sensor signal $U_s$ which happens to be present during the short duration starting pulse. The digitized output signal of the converter 7 is supplied through the conductor 26 to the input 30 of the fast Fourier transformation processor 13.

The square wave formed chopper signal $C_s$ is supplied through a signal conductor 24 to one input of the phase detector 9 forming the input circuit of the phase locked loop 8 mentioned above. The output of the phase detector 9 is shown at (c) in FIG. 2 and supplied to an input of a proportional-integral-action controller amplifier 10, the output of which is supplied to an input of a voltage controlled oscillator 11. The output of the PI-controller 10 is shown at (d) of FIG. 2. The other input of the phase detector 9 receives through the conductor 27 a transmission pulse train as shown at (b) in FIG. 2. The pulses of the transmission pulse train (b) have a relatively short duration and their impulse frequency $f_u$ is controlled in a phase locked, closed loop fashion and accurately with regard to the chopper frequence $f_c$.

The operation of the phase locked loop circuit 8 will now be described with reference to FIG. 2. As mentioned, the periodic chopper signal $C_s$ is shown at (a) in FIG. 2. Due to the square wave generator 22 the signal (a) is a periodic square wave voltage. Two pulses of the above mentioned carry pulse or impulse train (b) are shown in FIG. 2. It is desired that the leading edge of each square wave of the chopper signal $C_s$ coincides exactly with the center of a carry pulse or impulse (b). This is the case in the right-hand part of FIG. 2. If the center of the carry pulse or impulse (b) does not coincide with the leading edge of the chopper signal as shown in the left-hand part of FIG. 2, the output of the phase detector 9 will provide a signal which is stretched out prior to the rising edge of the chopper signal $C_s$ and shortened thereafter as shown at (c) in the left-hand part of FIG. 2. This signal wave form results from the multiplication of the signal voltages shown at (a) and (b) in the left hand part of FIG. 2 and sign reversal. As mentioned, the wave form shown in the right-hand part of FIG. 2 represents the desired signal characteristic according to which the center of the carry pulse or impulse (b) coincides exactly with the rising edge of the chopper signal $C_s$. The PI-controller amplifier 10 integrates the output signal voltage (d) coming from the phase detector 9 over time.

In case of the nonsymmetric position of the transmission pulse (b) there is a change in the voltage level after occurence of a transmission pulse. On the other hand, where the transmission pulse remains symmetric, as shown in the right-hand part of FIG. 2, the output voltage of the PI-controller 10 remains constant. An increasing voltage at the input of the voltage controlled oscillator 11 causes a reduction in the impulse frequency of the impulse train or sequence appearing at the output of the oscillator 11. As a result, the next following carry pulse or impulse is somewhat delayed, whereby it attains the desired centered position as will now be explained in more detail below.

The output pulse train or sequence appearing at the output of the voltage controlled oscillator 11 is supplied through a signal conductor 28 to the input of a counter 12 which is adjustable to a selectable counting level M. Thus, each time when the counter 12 reaches the level or count M it produces a transfer or rather said carry pulse (b) which is supplied through the signal conductor 27 to the other input of the phase detector 9, and the counter starts counting again. By selecting the counting level M it is assured that the impulse frequency $f_u$ of the carry impulse train or sequence corresponds to the frequency $f_c$ of the periodic chopper signal $C_s$ in a properly adjusted operating condition. Additionally, the impulse frequency of the pulse train at the output of the voltage controlled oscillator 11 is higher by the factor M than the frequency $f_c$ of the chopper signal $C_s$ in the adjusted operating condition. Thus, within a period $T_c$ of the chopper signal $C_s$ there are M pulses of the pulse sequence appearing at the output of the oscillator 11. This pulse sequence (e) is supplied also to the second input of the analog-to-digital converter 7 through the signal conductor 25 where the signal sequence functions as starting pulses for the digitizing of the sensor signal $U_s$ at the input 23 of the converter 7. Accordingly, the counting level M of the counter 12 determines how often within a period of the sensor signal the latter is sampled for obtaining digital amplitude values. The counting level or value M should be clearly larger than two, for example, it should be between eight and twenty-four to obtain a sufficient number of amplitude samples.

As mentioned, the counter 12 counts to the value M the pulses received through the signal conductor 28, whereby it sums the pulses up to the level M and then is reset to zero. In the stationary condition the counting duration between zero and M corresponds exactly to the period $T_c$ of the chopper signal $C_s$. The counter 12 has a second output connected through a signal conductor 29 to a second input 31 of the FFT-processor 13. Thus, the input 31 also receives M counted values in synchronism with the counting operation. These counted values are spaced in time by $2\pi T_c/M$. Thus, the period $T_c$ is divided into M sequential portions, whereby these portions are sequentially numbered with the counting values from zero to $M-1$. These counting values thus provide, relative to the total duration $2\pi$ of a period $T_c$, the respective instantaneous phase in increments of $2\pi/M$ of the chopper signal $C_s$. As a result, both inputs 30 and 31 of the FFT-processor 13 are provided with sequential value pairs within a period. More specifically, the input 30 receives the digitized amplitude of the sensor signal $U_s$ and the input 31 receives the corresponding instantaneous phase of the chopper signal $C_s$.

The FFT-processor 13 is able to perform the fast Fourier transformation with these value pairs in accordance with the following calculation method, assuming first that analog signals are involved. It is further assumed that the periodic sensor signal contains an oscillation with an amplitude $A_s$ and an angular frequency $\Omega$ as follows: $A_s \sin(\Omega t + \phi)$. If this signal component is mixed on the one hand with a first reference signal $\sin\Omega t$, and on the other hand with a second reference signal $\cos\Omega t$, a convolution takes place in the mathematical sense, whereby a phase difference $\phi$ is to be taken into account between sensor signal and chopper signal. The following equations express the mixing or folding result:

$$I = A_s \sin(\Omega t + \phi)\sin\Omega t = \frac{A_s}{2}[\cos\phi - \cos(2\Omega t + \phi)]$$

$$Q = A_s \sin(\Omega t + \phi)\sin\Omega t = \frac{A_s}{2}[\sin\phi - \sin(2\Omega t + \phi)].$$

When these equations are averaged, or rather integrated, over one or more periods, the terms with the double angular frequency $2\Omega$ are eliminated, and the following two quasi stationary or DC signals $\bar{I}$ and $\bar{Q}$ remain:

$$\bar{I} = (A_s/2)\cos\phi \quad \bar{Q} = (A_s/2)\sin\phi.$$

With the following equation the amplitude $A_s$ may be calculated from these values $$A_s = 2\sqrt{\bar{I}^2 + \bar{Q}^2} \tag{I}$$

It will be noted that the result of this mixing and filtering operation is independent of the phase difference $\phi$. This is so because the mixing took place with a sine and with a cosine signal. Thus, for determining, for example, the amplitude $A(\omega)$ of the fundamental wave, the periodic sensor signal containing many frequencies would have to be mixed with sine and cosine reference signals having each time a corresponding frequency $(\omega)$. After the mixing all higher frequencies would have to be filtered out of the mixed signal. The desired amplitude $A(\omega)$ may then be calculated with the aid of the above mentioned equation (I) and with the aid of the two measured results $\bar{I}$ and $\bar{Q}$ which are obtained as a result of the mixing and filtering operation. For the determination of the amplitudes of further frequencies contained in the sensor signals the operations are to be repeated in an analogous manner.

On the other hand, when digitized amplitude values of the sensor signals are used as taught by the invention, the Fourier-transformation must be modified. For this purpose it is first necessary to calculate in the FFT-processor 13 the sine and cosine function values corresponding to the counter values appearing at the input 31 of the processor 13. These sine and cosine function values provide so to speak, a digital image of the above mentioned analog sine and cosine reference signals. Additionally, as mentioned, the FFT-processor 13 receives at its input 30 the respective digital amplitude values of the sensor signals.

Let it be assumed that F(n) is the sequence of digital amplitude values of the sensor signal which sequence is repeated in the stationary condition during each period of the sensor signal. It is further assumed that $0 \leq n \leq M-1$ applies. If we call counting values $\phi_n$ which appear at the input 31 of the FFT-processor 13, then, $\phi_n$ can be expressed $\phi_n = 2\pi n/M$ with reference to the period $2\pi$. Accordingly, the values $\bar{I}$ and $\bar{Q}$ may be calculated with the following equations:

$$\bar{Q} = \sum_{n}^{0, M-1} F(n)\sin\phi_n \tag{II}$$

$$\bar{I} = \sum_{n}^{0, M-1} F(n)\cos\phi_n. \tag{III}$$

The desired amplitude is again calculated with equation (I). Thus, the FFT-processor 13 performs within each period two summing operations simultaneously, whereby the respective digital amplitudes $F_n$ of the sensor signal are multiplied with the corresponding sine or cosine function values of the incoming counting values n. The resulting products are then to be added up from n=0 to n=M-1.

As shown in FIG. 1 in dashed lines, a sine/cosine converter 32 may be connected with its input to the output 29 of the counter 12 and with its outputs to the FFT-processor 13. In other words, the calculation of the sine and cosine function values may take place outside the FFT-processor 13, if desired.

Following the above described calculation operations, the deviation signal becomes available at the output 33 of the FFT-processor 13. The deviation signal corresponds to the amplitude of the fundamental wave of the sensor signal $U_s$. If simultaneous calculations are performed for the formation of the presence signal, the latter becomes available at the output 34 of the processor 13. Equations (II) and (III) set forth above are also used for the calculation of the presence signal except that $\sin\phi_n$ and $\cos\phi_n$ are replaced by $\sin 2\phi_n$ and $\cos 2\phi_n$ respectively, because the presence signal corresponds to the second harmonic wave in the sensor signal.

Figure 3:
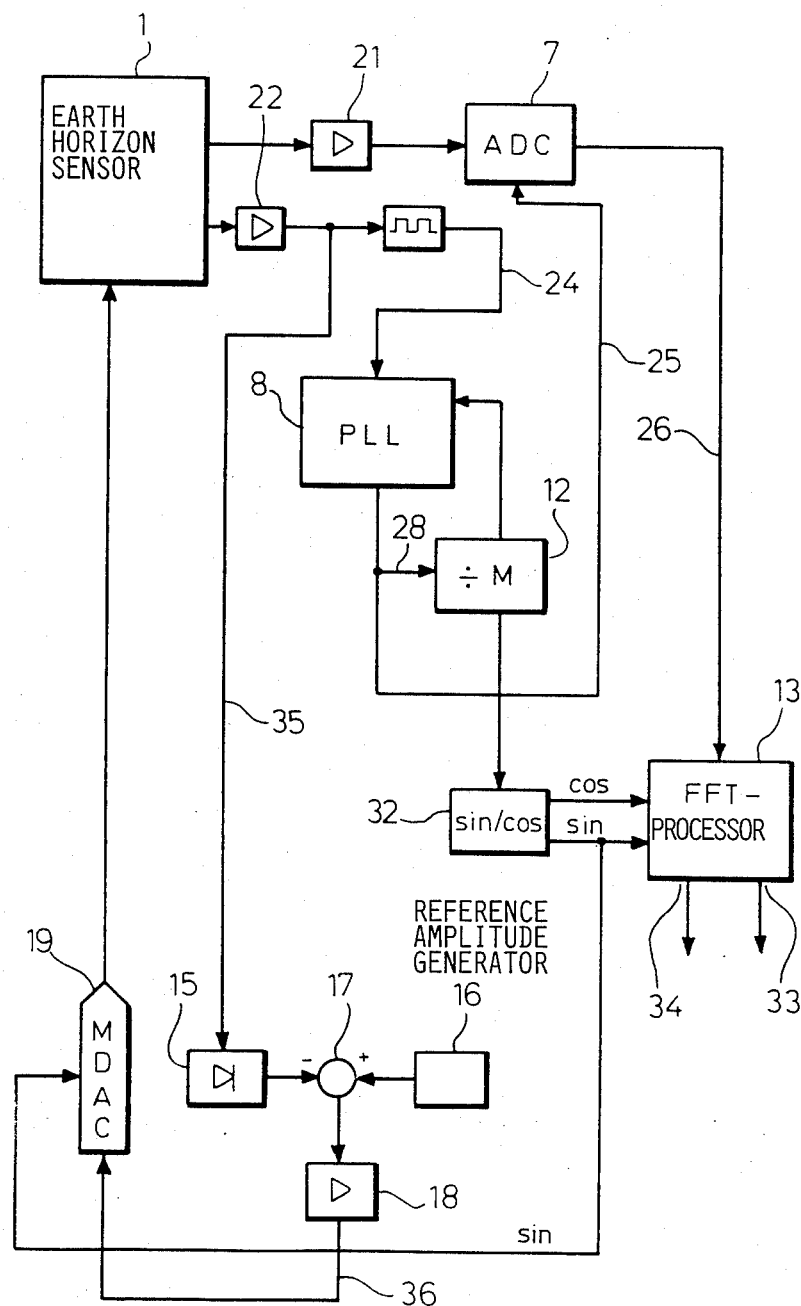
FIG. 3 illustrates a block circuit diagram similar to that of FIG. 1, but including circuit components for generating a drive signal for driving a chopper disk.

FIG. 3 shows a circuit arrangement according to the invention for generating a drive signal for the chopper drive 20 of the earth horizon sensor 1 as shown in FIG. 1. The components shown in FIG. 3, which are the same as in FIG. 1, are provided with the same reference numbers. It is desirable that the chopper disk 3 oscillates continuously with a constant amplitude or with an amplitude that may be influenced in accordance with controllable criteria.

The chopper signal at the output of the amplifier 22 and prior to its conversion into a square wave signal, is supplied through a signal conductor 35 to a precision rectifier 15, the output of which is connected to one input of a signal summing circuit 17. The other input of the signal summing circuit 17 is connected to an amplitude reference generator 16. The precision rectifier 15 determines the peak value of the amplitude $A_c$ of the chopper signal and this peak value is then subtracted from the amplitude reference value provided by the generator 16. If the chopper amplitude differs from the reference amplitude, the output of the signal summing circuit 17 will provide a difference signal to a control amplifier 18 which provides at its output a respective control signal. The control signal is supplied through a conductor 36 to one input of a multiplying digital-to-analog converter 19, the output of which is connected to the drive 20 of the chopper disk 3. The converter 19 has a second input connected to the sine signal output of the sine/cosine converter 32. As a result, the output signal of the converter 19 provides an analog signal having a sufficiently sinusoidal wave form for driving the chopper drive 20, whereby the oscillation of the chopper disk 3 retains the amplitude as determined by the amplitude reference generator 16 or this amplitude returns rapidly to the desired value in case disturbances should occur.

The basic teaching of the invention is not limited in its application to providing information signals regarding the deviation and/or presence signals of satellites for the purpose of correcting the position of the satellite. Rather, the present teaching can be generally used when a radiation is to be converted into a better measurable alternating signal. One example involves the radiation, especially infrared radiation emanating from a star. Another example involves reconnaissance satellites which scan the earth's surface in the infrared radiation range. In all these examples, the sensed radiation is chopped up by a chopper disk and received by a detector to provide a periodic sensor signal. Simultaneously, a periodic chopper signal is produced as described, and both signals are processed as disclosed above for obtaining a brightness information regarding the object being scanned from the fundamental wave of the sensor signal.

Although the invention has been described with reference to specific example embodiments, it will be appreciated, that it is intended, to cover all modifications and equivalents within the scope of the appended claims.

What I claim is:

1. An apparatus for generating a deviation signal and a presence signal, wherein said deviation signal represents a deviation of an optical axis of an optical means from a line connecting said optical means with the center of a distant radiation source which is imaged by said optical means onto its image plane, and wherein said presence signal represents an information whether said radiation source is located at all within a range of vision of said optical means, said apparatus comprising an oscillating chopper disk being located in said image plane of said optical means and having a diameter equal to that of the image of said radiation source and sensor means for receiving all the radiation components passing periodically past the edges of said oscillating chopper disk and for producing therefrom a periodic analog sensor signal, drive means for driving said chopper disk, pick-up means arranged for producing a periodic analog chopper signal, an analog-to-digital converter connected to receive said analog sensor signal for converting said analog sensor signal into a digitized sensor signal, a phase-locked-loop circuit including a phase detector having a first input for receiving said periodic analog chopper signal for providing a phase control signal, control amplifier means connected to an output of said phase detector for integrating said phase control signal, an oscillator connected to said control amplifier means for producing start impulses, means connecting said oscillator to a start input of said analog-to-digital converter for repeatedly starting a sampling and digitizing of said analog sensor signal, mode-M counter means having an input connected to said oscillator and an output connected to a second input of said phase detector thereby providing a closed loop phase control circuit, said mode-M counter means counting up to a preselected number M and, upon reaching the count of M, providing phase reference carry signals to said second input of said phase detector, fast Fourier transformation processing means having a first input connected to said analog-to-digital converter for receiving said digitized sensor signal, and means connecting a second input of said fast Fourier transformation processing means to said mode-M counter means for receiving counted values having the same frequency or rhythm as said start impulses and being continuously numbered between two neighboring phase reference carry signals, whereby said fast Fourier transformation processing means produce said deviation signal and said presence signal.

2. The apparatus of claim 1, wherein said radiating source is the earth, and wherein said apparatus is installed in an earth satellite for producing said deviation signal signifying an aberration of the orientation of said earth satellite relative to a line connecting said earth satellite to the center of the earth.

3. The apparatus of claim 1, wherein said radiating source is the earth, and wherein said apparatus is installed in an earth satellite for producing said presence signal signifying whether the earth is present within the range of vision of said optical means.

4. The apparatus of claim 1, wherein said control amplifier means is a PI-(proportional-integral-action) controller circuit.

5. The apparatus of claim 1, wherein said oscillator is a voltage controlled oscillator for changing the frequency of the oscillator in response to the voltage change at the oscillator input.

6. The apparatus of claim 1, wherein said connecting means between said mode-M counter means and said second input of said fast Fourier transformation processing means comprise a sin cosine values evaluating circuit for providing the sine and cosine values for said counter values.

7. The apparatus of claim 6, further comprising means for generating a drive signal for operating said chopper disk drive means.

8. The apparatus of claim 7, wherein said drive signal generating means comprise a rectifier connected to receive said periodic analog chopper signal for rectifying said periodic analog chopper signal, a signal generator for generating a reference amplitude signal, a signal summing circuit having one input connected to an output of said rectifier and a second input connected to an output of said signal generator for producing a difference signal at an output of said signal summing circuit, a multiplying digital-to-analog converter having an output connected to said chopper disk drive means, circuit means operatively connecting an output of said signal summing circuit to said digital-to-analog converter for supplying said difference signal to one input of said digital-to-analog converter, said apparatus further including further circuit means for supplying an output signal of said sine-cosine value evaluating circuit to a further input of said digital-to-analog converter.

9. The apparatus of claim 8, wherein said connecting circuit means comprise a control amplifier for amplifying said difference signal, and wherein said further connecting circuit means supply sine signals to said further input of said digital-to-analog converter.

* * * * *